(12) United States Patent
Cho et al.

(10) Patent No.: US 10,767,078 B2
(45) Date of Patent: Sep. 8, 2020

(54) WATER-BASED PAINT COMPOSITION FOR VEHICLE

(71) Applicant: KCC Corporation, Seoul (KR)

(72) Inventors: Su Young Cho, Jeollabuk-do (KR); Yong Joo Kim, Gyeonggi-do (KR); Seung Min Hong, Gyeonggi-do (KR); So Jin Kang, Gyeongsangnam-do (KR); Yong Ho Choi, Gyeonggi-do (KR); Bon Yi Lee, Gyeonggi-do (KR)

(73) Assignee: KCC Corporation, Seoul (KR)

( * ) Notice: Subject to any disclaimer, the term of this patent is extended or adjusted under 35 U.S.C. 154(b) by 362 days.

(21) Appl. No.: 15/579,121

(22) PCT Filed: Jun. 2, 2016

(86) PCT No.: PCT/KR2016/005849
§ 371 (c)(1),
(2) Date: Dec. 1, 2017

(87) PCT Pub. No.: WO2016/195390
PCT Pub. Date: Dec. 8, 2016

(65) Prior Publication Data
US 2018/0163088 A1 Jun. 14, 2018

(30) Foreign Application Priority Data
Jun. 3, 2015 (KR) .................. 10-2015-0078704

(51) Int. Cl.
| | | |
|---|---|---|
| *C09D 167/00* | (2006.01) | |
| *C09D 175/14* | (2006.01) | |
| *C09D 201/00* | (2006.01) | |
| *C09D 175/06* | (2006.01) | |
| *C09D 151/00* | (2006.01) | |
| *C08G 18/67* | (2006.01) | |
| *C08G 63/12* | (2006.01) | |
| *C08G 63/78* | (2006.01) | |

(52) U.S. Cl.
CPC ......... *C09D 175/14* (2013.01); *C08G 18/672* (2013.01); *C08G 63/12* (2013.01); *C08G 63/78* (2013.01); *C09D 151/003* (2013.01); *C09D 167/00* (2013.01); *C09D 175/06* (2013.01); *C09D 201/00* (2013.01); *C08L 2201/52* (2013.01); *C08L 2207/53* (2013.01); *Y02P 20/124* (2015.11)

(58) Field of Classification Search
CPC ............. C09D 151/003; C09D 167/00; C09D 175/06; C09D 175/14; C09D 201/00; C08L 67/08; C08L 75/04; C08L 2201/52; C08L 2207/53
See application file for complete search history.

(56) References Cited

U.S. PATENT DOCUMENTS

| | | | | |
|---|---|---|---|---|
| 7,550,206 | B2* | 6/2009 | Muller | C08F 265/04 428/522 |
| 9,701,866 | B2* | 7/2017 | Kanda | C09D 5/02 |
| 2003/0220446 | A1* | 11/2003 | Faler | C08G 18/672 524/590 |
| 2006/0128887 | A1* | 6/2006 | Muller | C08F 265/04 524/832 |
| 2006/0211813 | A1* | 9/2006 | Mueller | C08F 265/04 524/556 |
| 2011/0111242 | A1 | 5/2011 | Tomizaki et al. | |
| 2012/0003487 | A1 | 1/2012 | Richert et al. | |
| 2012/0107619 | A1 | 5/2012 | Kitagawa et al. | |
| 2015/0064476 | A1* | 3/2015 | Kanda | C08G 18/4063 428/423.1 |
| 2015/0225596 | A1 | 8/2015 | Kitagawa et al. | |
| 2015/0267077 | A1* | 9/2015 | Janoski, Sr. | C08G 18/758 428/206 |
| 2016/0083617 | A1 | 3/2016 | Koyama et al. | |

(Continued)

FOREIGN PATENT DOCUMENTS

| | | |
|---|---|---|
| CN | 104059533 A | 9/2014 |
| JP | H04-264157 A | 9/1992 |

(Continued)

OTHER PUBLICATIONS

"Solubility". Hawley's Condensed Chemical Dictionary. Copyright © 2007 by John Wiley & Sons, Inc. First published: Mar. 15, 2007. https://doi.org/10.1002/9780470114735.hawley14950.*
"Pigment". Hawley's Condensed Chemical Dictionary. Copyright © 2007 by John Wiley & Sons, Inc. First published: Mar. 15, 2007. https://doi.org/10.1002/9780470114735.hawley12903.*
CN201680032447.4 Office Action dated May 15, 2019; 6 pgs.
EP16803745.5 Extended European Search Report dated Apr. 11, 2018, 6 pgs.
JP2017562275 Office Action dated Jan. 11, 2019; 2 pgs.
PCT/KR2016/005849 International Search Report dated Oct. 10, 2016; 2 pgs.

*Primary Examiner* — Michael A Salvitti
(74) *Attorney, Agent, or Firm* — Morgan, Lewis & Bockius LLP

(57) ABSTRACT

Embodiments relate to a water soluble paint composition for a vehicle. The water soluble paint composition includes a core-shell microgel resin, a dimer-modified polyester resin, a (meth)acryl-modified polyurethane resin, a curing agent, a pigment, and water, wherein the dimer-modified polyester resin is included in an amount of 1 to 10 wt % with respect to 100 wt % of the water-soluble paint composition. When the water soluble paint composition according to various embodiments is used to paint a vehicle, air handling equipment and an oven are not needed, so that energy can be saved in the painting process, $CO_2$ production can be reduced, costs can be saved for painting equipment and maintenance, and space for a painting line can be saved, and a paint layer can be formed having excellent smoothing, waterproofing, chipping resistance, and outer appearance.

6 Claims, No Drawings

(56) References Cited

U.S. PATENT DOCUMENTS

2016/0175886 A1 6/2016 Richert et al.
2018/0163088 A1* 6/2018 Cho .................... C08G 18/672

FOREIGN PATENT DOCUMENTS

| JP | 2007297545 A | 11/2007 |
| JP | 2011525415 A | 9/2011 |
| JP | 2012516768 A | 7/2012 |
| JP | 2014210225 A | 11/2014 |
| KR | 10-2003-0057779 A | 7/2003 |
| KR | 10-0484060 B | 12/2005 |
| KR | 10-2006-0078972 A | 7/2006 |
| KR | 10-0665882 B | 1/2007 |
| KR | 10-2011-0077576 A | 7/2011 |
| KR | 10-1053840 B1 | 8/2011 |
| KR | 10-2013-0076586 A | 7/2013 |
| KR | 10-2014-0115807 A | 10/2014 |

* cited by examiner

WATER-BASED PAINT COMPOSITION FOR VEHICLE

CROSS REFERENCE TO RELATED APPLICATIONS

This application claims the benefit of and priority to PCT/KR2016/005849, filed on Jun. 2, 2016, entitled (translation), "WATER SOLUBLE PAINT COMPOSITION FOR VEHICLE," which claims the benefit of and priority to Korean Patent Application No. 10-2015-0078704, filed on Jun. 3, 2015, each of which is hereby incorporated by reference in their entirety into this application.

BACKGROUND

Field

Embodiments relate to a water-based paint composition for a vehicle. More particularly, various embodiments relate to a water-based paint composition for a vehicle that is excellent in chip resistance and appearance.

The development of a water-based paint is actively ongoing in response to the regulation of volatile organic compounds (VOCs) that has recently been strengthened to protect the global environment. Particularly, in the case of automotive paints containing an effect pigment (e.g., aluminum and mica), in which the use of a water-based type will significantly reduce the use of solvents, the existing solvent-based paints have been replaced rapidly, especially by the advanced automobile companies.

In recent years, automobile manufacturers have a preference for a more eco-friendly and economical coating system, and, accordingly, various coating systems have been developed. For example, Korean Registered Patent No. 10-0484060 discloses a low temperature curing type high-solid water-based paint composition, which cures at low temperature, is high solid, and imparts high impact resistance to the film of paint. The paint composition has a low baking temperature and an increased solid content, resulting in process cost reduction and energy savings. In addition, the water-based multilayer coating method disclosed in Korean Registered Patent No. 10-0665882 is a coating technique commonly referred to as "the water-based 3-Coat-1-Bake (3C1B) coating system". The water-based 3C1B coating system is eco-friendly because it minimizes the use of VOCs by using aqueous middle and upper basecoats, and is also highly economical because it can eliminate an intermediate baking process (complete curing at 140 to 150° C. for 20 to 30 minutes), which has always been required in the 3C2B coating system.

Eco-friendly techniques involving a shortened coating process that have been introduced to the automobile industry until now comprise the water-soluble 3C1B technique, in which an intermediate oven process is omitted, and the water-based middle coatless technique, in which the entire intermediate coating process is omitted.

However, the water-based 3C1B technique is disadvantageous in that it still requires the space and costs for installing an intermediate coating booth for an intermediate coating process and an intermediate drying oven for an intermediate drying process.

In the water-based middle coatless coating technique, the second basecoat is applied wet-on-wet on the first basecoat that has previously been applied, and, after a hot-air drying process at a temperature of 50 to 80° C. for two to seven minutes, a clearcoat is applied. Although such a middle coatless technique is the most preferred technique in the automotive industry in view of cost savings, when the intermediate coating process is simply eliminated from the existing coating system, the electrodeposited film of paint may suffer delamination by ultraviolet rays that destroy the film of paint, and low chip resistance, poor mutual adhesion, etc. may result.

Therefore, there is a demand for the development of a water-based paint composition for vehicle that is applicable to the water-based middle coatless coating technique preferred recently in the automotive industry and can impart an appearance and material properties comparable to, or more desirable than, those offered by the existing technique to the final film of paint.

SUMMARY

Embodiments provide a water-based paint composition for a vehicle that is applicable to the water-based middle coatless coating technique, can produce a film of paint excellent in smoothness, water resistance, chip resistance, and appearance, and, even when the paint composition is applied on a wet-on-wet basis and heating is not performed after coating, the uncured film of paint and the basecoat do not mix with each other.

The water-based paint composition for the vehicle according to at least one embodiment includes a core-shell microgel resin, a dimer-modified polyester resin, a (meth)acryl-modified polyurethane resin, a curing agent, a pigment, and water, wherein the dimer-modified polyester resin is comprised in an amount of 1 to 10 wt % with respect to 100 wt % of the paint composition.

According to at least one embodiment, the core-shell microgel resin has a solid content of 30 to 70% with respect to a total weight of the core-shell microgel resin, an acid value of 5 to 60 mgKOH/g, a glass transition temperature of −15 to 20° C., and a particle diameter of 50 to 200 nm.

According to at least one embodiment, the dimer-modified polyester resin is a polyester resin produced by condensation polymerization of a dicarboxylic acid component comprising a dimer acid, with a polyhydric alcohol component comprising a diol obtained by reducing a dimer acid.

According to at least one embodiment, the dimer-modified polyester resin has a solid content of 60 to 90% with respect to a total weight of the dimer-modified polyester resin, an acid value of 5 to 40 mgKOH/g, a number average molecular weight of 1,000 to 4,000, and a glass transition temperature of −40 to −20° C.

According to at least one embodiment, the (meth)acryl-modified polyurethane resin is a modified polyurethane resin produced by reacting a urethane prepolymer, which is a reaction product of a polyol and an isocyanate, with one or more (meth)acrylates.

According to at least one embodiment, the (meth)acryl-modified polyurethane resin has a solid content of 30 to 60% with respect to a total weight of the (meth)acryl-modified polyurethane resin, a number average molecular weight of 8,000 to 100,000, an acid value of 15 to 35 mgKOH/g, and a particle diameter of 50 to 200 nm.

According to various embodiments, the use of the water-based paint composition for coating an automobile can eliminate the need for air conditioning and an oven. Therefore, the energy required for the coating process can be saved, $CO_2$ production can be reduced, costs for coating equipment and maintenance can be reduced, and space on the coating line can be saved, while a film of paint excellent in smoothness, water resistance, chip resistance, and appearance can still be produced.

DETAILED DESCRIPTION

Hereinafter, embodiments of the invention will be described in greater detail.

The term "(meth)acryl" used herein encompasses both acryl and methacryl.

The core-shell microgel resin comprised in the paint composition according to various embodiments is an ingredient concerning overall material properties, such as the appearance of the film of paint, the ability to prevent interlayer penetration, a leveling property, wettability, an adhesion property, and water resistance.

According to at least one embodiment, the core-shell microgel resin may include an unsaturated monomer making up the core at 20 to 80 wt % and an unsaturated monomer making up the shell at 20 to 80 wt % with respect to the total weight of the core-shell microgel resin. Also, the core-shell microgel resin may further include a crosslinking agent, an initiator, an emulsifier, etc.

According to at least one embodiment, constituent ingredient for the core is, for example, at least one unsaturated monomer selected from the group consisting of acrylic acid, methacrylic acid, acrylic acid alkyl esters having a C1-C8 alkyl group, methacrylic acid alkyl esters having a C1-C4 alkyl group, aromatic vinyl compounds, vinyl cyanide compounds; and hydroxyalkyl acrylates and hydroxyalkyl methacrylates having at least one hydroxy group and a C5-C8 alkyl group. The unsaturated monomer is preferably at least one selected from the group consisting of styrene, vinyl toluene, butyl acrylate, 2-ethylhexyl acrylate, butyl methacrylate, methyl methacrylate, acrylic acid, methacrylic acid, 2-ethylhexyl methacrylate, 1,6-hexanediol diacrylate, and triallyl isocyanurate.

According to at least one embodiment, constituent ingredient for the shell is, for example, at least one unsaturated monomer selected from the group consisting of acrylic acid, methacrylic acid, acrylic acid alkyl esters having a C1-C8 alkyl group, methacrylic acid alkyl esters having a C1-C4 alkyl group, aromatic vinyl compounds, vinyl cyanide compounds; and hydroxyalkyl acrylates and hydroxyalkyl methacrylates having at least one hydroxy group and a C5-C8 alkyl group. The unsaturated monomer is preferably at least one selected from the group consisting of acrylic acid, methacrylic acid, maleic acid, styrene, vinyl toluene, butyl acrylate, butyl methacrylate, ethyl acrylate, methyl methacrylate, 2-hydroxypropyl methacrylate, 2-hydroxyethyl acrylate, 2-hydroxyethyl methacrylate, 2-hydroxypropyl methacrylate, aryl methacrylates, and 1,6-hexanediol diacrylate.

According to at least one embodiment, core-shell microgel resin is, for example, a resin having a solid content of 30 to 70% with respect to the total weight of the resin, an acid value of 5 to 60 mgKOH/g, a glass transition temperature of −15 to 20° C., and a particle diameter of 50 to 200 nm.

In the paint composition according to various embodiments, the core-shell microgel resin is comprised, for example, in an amount of 5 to 40 wt %, and more specifically, 10 to 35 wt % or 20 to 30 wt % with respect to 100 wt % of the paint composition, but the various embodiments are not limited thereto. When the content of the core-shell microgel resin in the paint composition is excessively low, a composition poor in film of paint-forming ability, a drying property, a mechanical material property, etc. may be obtained. On the other hand, when the content of the core-shell microgel resin is excessively high, a paint poor in wettability and a leveling property may be obtained, thus resulting in a film of paint with poor appearance. Also, in this case, the resulting film of paint may also be poor in chip resistance, impact resistance, etc.

According to at least one embodiment, dimer-modified polyester resin included in the paint composition according to various embodiments may be produced by the condensation polymerization of a dicarboxylic acid and a polyhydric alcohol. The dicarboxylic acid may be a dicarboxylic acid including a dimer acid, and the polyhydric alcohol may be a polyhydric alcohol comprising a diol obtained by reducing a dimer acid. Preferably, the dimer-modified polyester resin is a polyester resin produced by reacting an acid anhydride with the hydroxy groups at both terminals of the substance resulting from the condensation polymerization of a dicarboxylic acid component, including a dimer acid, at 50 wt % with a polyhydric alcohol component, such as a diol obtained by reducing a dimer acid, at 50 wt %. Here, the dimer acid may be a dicarboxylic acid produced by dimerizing unsaturated fatty acids (specifically, C14-C22 unsaturated fatty acids, e.g., stearic acid).

According to at least one embodiment, dimer-modified polyester resin may be produced using one selected from the group consisting of succinic acid, adipic acid, sebacic acid, phthalic acid, terephthalic acid, isophthalic acid, tetrahydrophthalic acid, hexahydrophthalic acid, tetrachlorophthalic acid, cyclohexanedicarboxylic acid, azelaic acid, 1,10-decanedicarboxylic acid, and combinations thereof as the dicarboxylic acid component other than a dimer acid; and one selected from the group consisting of ethylene glycol, diethylene glycol, triethylene glycol, 1,3-propanediol, 1,3-butanediol, 1,4-butanediol, 1,5-pentanediol, 1,6-hexanediol, 2-ethyl-1,3-hexanediol, 1,9-nonanediol, 1,10-decanediol, propylene glycol, 1,4-cyclohexanedimethanol, neopentyl glycol, 2-butyl-2-ethyl-1,3-propanediol, 2,2-diethyl-1,3-propanediol, 1,4- and 1,3-cyclohexanedimethanol, hydrogenated bisphenol A, and combinations thereof as the polyhydric alcohol component other than a diol obtained by reducing a dimer acid. Also, one selected from the group consisting of 1,3,4-cyclopentanetricarboxylic anhydride, benzene tricarboxylic anhydrides (1,2,3-benzene tricarboxylic anhydride, trimellitic anhydride (1,2,4-benzenetricarboxylic anhydride), etc.), naphthalene tricarboxylic anhydrides (1,2,4-naphthalene tricarboxylic anhydride, 1,4,5-naphthalene tricarboxylic anhydride, 2,3,6-naphthalene tricarboxylic anhydride, 1,2,8-naphthalene tricarboxylic anhydride, etc.), 3,4,4'-benzophenonetricarboxylic anhydride, 3,4,4'-biphenyl ether tricarboxylic anhydride, 3,4,4'-biphenyltricarboxylic anhydride, 2,3,2'-biphenyltricarboxylic anhydride, 3,4,4'-biphenylmethane tricarboxylic anhydride, 3,4,4'-biphenyl sulfone tricarboxylic anhydride, and combinations thereof may be used as the acid anhydride.

According to at least one embodiment, dimer-modified polyester resin is, for example, a resin having a solid content of 60 to 90% with respect to the total weight of the resin, a number average molecular weight of 1,000 to 4,000, and a glass transition temperature of −40 to −20° C. In addition, the dimer-modified polyester resin may have an acid value of 5 to 40 mgKOH/g. When the dimer-modified polyester resin has an excessively low acid value, the resin attains low water dispersibility and thus may result in a paint composition with low stability. On the other hand, when the dimer-modified polyester resin has an excessively high acid value, a film of paint poor in appearance and water resistance may result.

In the paint composition according to various embodiments, the dimer-modified polyester resin may be comprised in an amount of 1 to 10 wt %, and more specifically, 2 to 8 wt % or 2 to 5 wt % with respect to 100 wt % of the paint composition, but the present invention is not limited thereto. When the content of the dimer-modified polyester resin in the paint composition is below 1 wt %, a film of paint poor in appearance, adhesion, and chip resistance may result. When the content of the dimer-modified polyester resin exceeds 10 wt %, a film of paint low in water resistance and hardness may result.

According to at least one embodiment, (meth)acryl-modified polyurethane resin comprised in the paint composition is an ingredient concerning material properties such as a leveling property, wettability, an adhesion property, water resistance, impact resistance, and chip resistance.

According to at least one embodiment, (meth)acryl-modified polyurethane resin may be a modified polyurethane resin produced by reacting a urethane prepolymer, which is a reaction product of a polyol and an isocyanate, with one or more (meth)acrylates. Preferably, the produced (meth)acryl-modified polyurethane resin comprises a urethane prepolymer at 70 wt % and a (meth)acrylate at 30 wt % with respect to 100 wt % of the (meth)acryl-modified polyurethane resin.

According to at least one embodiment, urethane prepolymer may be produced using one selected from the group consisting of polyester polyols, polycarbonate polyols, polyether polyols, and combinations thereof as the polyol; one selected from the group consisting of isophorone diisocyanate, 1,6-hexamethylene diisocyanate, 4,4-bis(isocyanatocyclohexyl)methane, and combinations thereof or the group consisting of dimethylolpropionic acid having a monofunctional carboxylic acid, dimethylolbutanoic acid having a monofunctional carboxylic acid, and combinations thereof as the isocyanate; and one selected from the group consisting of methyl methacrylate, butyl methacrylate, ethyl acrylate, n-butyl acrylate, aryl acrylate, 1,6-hexanediol methacrylate, and combinations thereof as the (meth)acrylate.

According to at least one embodiment, (meth)acryl-modified polyurethane resin is, for example, a resin having a solid content of 30 to 60% with respect to the total weight of the resin, a number average molecular weight of 8,000 to 100,000, an acid value of 15 to 35 mgKOH/g, and a particle diameter of 50 to 200 nm.

In the paint composition according to various embodiments, the (meth)acryl-modified polyurethane resin is comprised, for example, in an amount of 2 to 20 wt %, and more specifically, 3 to 18 wt % or 4 to 8 wt % with respect to 100 wt % of the paint composition, but the various embodiments are not limited thereto. When the content of the (meth)acryl-modified polyurethane resin in the paint composition is excessively low, a composition having low film of paint-forming ability and poor mechanical properties such as chip resistance and impact resistance may be obtained. On the other hand, when the content of the (meth)acryl-modified polyurethane resin in the paint composition is excessively high, a film of paint with a poor drying property may be obtained, thereby resulting in poor appearance.

According to at least one embodiment, curing agent comprised in the paint composition forms a crosslink with the core-shell microgel resin, dimer-modified polyester resin, and (meth)acryl-modified polyurethane resin during a curing process.

As the curing agent, a hydrophilic melamine resin having an imino group may be used. In this case, the methoxy group and imino group of the hydrophilic melamine resin forms a crosslink with the hydroxy group of the resins listed above.

As such a hydrophilic melamine resin, a resin synthesized in the laboratory by a known method or a commercially available resin, such as CYMEL® 325, CYMEL® 327, and CYMEL® 385 available from Cytec, and Resimene® HM 2608, Resimene® 718, and Resimene® 717 available from INEOS Group, may be used.

In the paint composition according to various embodiments, the curing agent may be comprised, for example, in an amount of 2 to 10 wt %, and more specifically, 3 to 9 wt % or 4 to 7 wt % with respect to 100 wt % of the paint composition, but the various embodiments are not limited thereto. When the content of the curing agent in the paint composition is excessively low, an uncrosslinked hydroxy group may remain in the film of paint, and thus a film of paint having poor water resistance and exhibiting low adhesion between an existing film and a newly applied film may result. On the other hand, when the content of the curing agent is excessively high, a film of paint having the tendency to crumble due to the self-polymerization of a remaining uncured curing agent therein and thus being poor in chip resistance, impact resistance, and flexibility may result, and a paint composition with undesirable thermal storage stability may be obtained.

As the pigment comprised in the paint composition according to various embodiments, any pigment substance typically used for an automotive paint composition, such as an effect pigment for imparting a metallic effect to a film of paint, a coloring pigment for producing a coloring effect and a hiding effect by combining with a film of paint-forming substance, or a combination thereof, may be used without particular limitation. Examples of the effect pigment comprise aqueous-treated aluminum flakes, mica pigments, and combinations thereof. Examples of the coloring pigment comprise oxide-based inorganic pigments, azo pigments, polycyclic organic pigments such as vat pigments, anthraquinone organic pigments, and combinations thereof.

In the paint composition according to various embodiments, the pigment is comprised, for example, in an amount of 1 to 30 wt %, and more specifically, 3 to 27 wt % or 5 to 25 wt % with respect to 100 wt % of the paint composition, but the various embodiments are not limited thereto. When the content of the pigment in the paint composition is excessively low, a film of paint with poor hiding power may result. On the other hand, when the content of the pigment is excessively high, a paint poor in stability and pigment dispersibility may be obtained.

According to at least one embodiment, paint composition includes water, for example, in an amount of 5 to 30 wt %, and more specifically, 8 to 27 wt % or 10 to 25 wt % with respect to 100 wt % of the paint composition, but the various embodiments are not limited thereto. When the content of water in the paint composition is excessively low, poor appearance such as paint smudging due to a poor rheological property may result. On the other hand, when the content of water is excessively high, sagging and poor hiding may result.

In addition, the paint composition according to various embodiments may further include, for example, one or more additives selected from the group consisting of cosolvents, thickeners, and antifoaming agents.

The cosolvent may be used to affect the smoothness of the film of paint, impart storage stability to the paint, lower the minimum temperature at which the film of paint forms, and contribute to solvent volatilization during a coating process. For example, the cosolvent is one or more selected from the group consisting of propylene glycol, N-methyl-2-pyrrolidone, n-propyl alcohol, i-propyl alcohol, n-butanol, propylene glycol monomethyl ether, butylene glycol, hexylene glycol, 2-ethylhexyl alcohol, and butyl carbitol, and is comprised in an amount of 5 to 22.5 wt % with respect to 100 wt % of the paint composition.

According to at least one embodiment, thickener may be used to prevent the flowability of the water-soluble paint composition and contribute to improvements in paint workability and film of paint roughness. For example, the thickener is one or more selected from the group consisting of acryl thickeners, urethane thickeners, fused silica, cellulosic thickeners, and bentonite thickeners, and is comprised in an amount of 0.15 to 7.5 wt % with respect to 100 wt % of the paint composition.

According to at least one embodiment, antifoaming agent may be used to inhibit the generation of air bubbles or immediately remove the air bubbles that have been generated during various processes such as preparing a paint composition and applying a coating, and after coating a substrate. For example, the antifoaming agent is one or more selected from the group consisting of fluorine-modified siloxane-based antifoaming agents, polysiloxane emulsions, organic-modified siloxane-based antifoaming agents, hydrophobic silica, and mineral oils, and is comprised in an amount of 0.15 to 3.0 wt % with respect to 100 wt % of the paint composition.

The preparation of the paint composition according to various embodiments is not limited to a particular method and may be accomplished using a method and devices typically used for preparing a water-based soluble paint composition.

When the paint composition according to various embodiments is used as a first basecoat and/or a second basecoat for the water-based middle coatless coating technique, the interlayer mixing (layer intermingling) between the first basecoat and the second basecoat or between a basecoat and a clearcoat may be minimized such that the degradation of film of paint appearance is avoided and excellent mechanical properties are attained at the same time. Therefore, another embodiment of the invention provides a method of coating an automobile using the above-described paint composition in an automotive coating line.

A method of coating an automobile according to a preferred but non-limiting embodiment is a middle coatless coating method in which the paint composition according to various embodiments is applied, as a first basecoat and a second basecoat, onto a surface for electrodeposition in an automotive coating line, dried by hot air at a temperature of 50 to 80° C. for two to seven minutes, a clearcoat is applied on top of the basecoats, and then all the coats are cured by baking at one time. Here, the second basecoat may further comprise an effect pigment as necessary.

Hereinafter, embodiments of the invention will be described in greater detail with reference to examples and comparative examples. However, the examples and comparative examples do not limit the scope of the various embodiments thereto.

EXAMPLES

Production Example 1: Production of Core-Shell Microgel Resin (1)

A 2 L four-necked round flask was equipped with a thermocouple, a stirrer, and a reflux device, 550 g of deionized water and 3.43 g of a reactive emulsifier (LATEMUL S-180A available from Kao Corporation) were introduced thereinto, and the temperature of the reactor was raised to 80° C. While raising the temperature of the reactor, a preliminary emulsion consisting of 150 g of deionized water, 15.58 g of LATEMUL S-180A, 166.66 g of butyl acrylate, 93.21 g of methacrylic acid, and 0.13 g of triallyl isocyanurate was introduced into a separatory funnel A, an initiator solution consisting of 25.0 g of deionized water and 0.38 g of ammonium persulfate was introduced into a separatory funnel B, and an initiator solution consisting of 30.0 g of deionized water and 0.14 g of ammonium persulfate was introduced into a separatory funnel C. When maintaining the temperature of the reactor at 80° C., 21.78 g of the preliminary emulsion in the separatory funnel A and the initiator solution in the separatory funnel B were simultaneously introduced into the reactor in a dropwise manner and maintained for 40 minutes. After a seed was formed, the initiator solution in the separatory funnel C was introduced into the reactor in a dropwise manner for ten minutes, and then the preliminary emulsion in the separatory funnel A was introduced into the reactor in a dropwise manner for three hours. After a one-hour reaction, the temperature was lowered to 50° C., the substances were packed while filtering through a 400-mesh filter. The synthesized core particles in the emulsion had a particle diameter of 120 nm as measured by laser light scattering (LLS) and a solid content of 26.0 wt %.

115.66 g of the core solution synthesized as described above and 450.15 g of deionized water were introduced into a 2 L four-necked round flask equipped with a thermocouple, a stirrer, and a reflux device, and the temperature was raised to 85° C. A preliminary emulsion consisting of 231.32 g of deionized water, 5.78 g of LATEMUL S-180A, 3.0 g of 2,2'-azobisisobutyronitrile, 56.3 g of styrene, 66.3 g of methyl methacrylate, 11.57 g of 2-hydroxyethyl methacrylate, 206.62 g of butyl acrylate, and 6.0 g of methacrylic acid was introduced into a separatory funnel. When maintaining the temperature of the reactor at 85° C., the preliminary emulsion in the separatory funnel was introduced into the reactor in a dropwise manner for three hours and maintained for one hour. Then, the inside of the reactor was cooled to 50° C., and the substances were packed while filtering through a 400-mesh filter. The synthesized core-shell microgel resin particles in the emulsion had a particle diameter of 150 nm as measured by LLS, a solid content of 35.0 wt %, a glass transition temperature (Tg) of −10° C., and an acid value of 27 mgKOH/g.

Production Example 2: Production of Polyester Resin (2)

351 g of adipic acid, 117 g of isophthalic acid, 47 g of trimethylolpropane, 81 g of neopentyl glycol, 293 g of 1,6-hexanediol, and 0.1 g of a dibutyltin oxide catalyst were introduced into a reactor for polyester resin production equipped with a stirrer, a thermometer, a reflux condenser, and a nitrogen injection tube, and the temperature was raised from 150° C. to 230° C. for three hours and was maintained at 230° C. for five hours. Then, the inside of the reactor was cooled to 160° C., 33 g of trimellitic anhydride was introduced into the reactor, and then stirring was performed for one hour to produce a polyester resin having an acid value of 27 mgKOH/g and a number average molecular weight of 1,200.

Production Example 3: Production of Dimer-Modified Polyester Resin (3)

97 g of a dimer acid (acid value=295 mgKOH/g, Pripol 1017 available from Croda International Plc), 117 g of isophthalic acid, 45 g of trimethylolpropane, 90 g of neopentyl glycol, 208 g of 1,6-hexanediol, and 0.1 g of a dibutyltin oxide catalyst were introduced into a reactor for polyester resin production equipped with a stirrer, a thermometer, a reflux condenser, and a nitrogen injection tube, and the temperature was raised from 150° C. to 230° C. for three hours and was maintained at 230° C. for five hours. Then, the inside of the reactor was cooled to 160° C., 34 g of trimellitic anhydride was introduced into the reactor, and then stirring was performed for one hour. The temperature was cooled to 90° C., and then 240 g of n-butanol was introduced into the reactor to produce a dimer-modified polyester resin having a solid content of 70 wt %, an acid value of 27 mgKOH/g, and a number average molecular weight of 1,100.

Production Example 4: Production of Polyurethane Resin (4)

260 parts by weight of a polyester polyol having a molecular weight of 2,000, 12 parts by weight of dimethylolpropionic acid, and 70 parts by weight of N-methylpyrrolidone were introduced into a reaction container, and the temperature was raised to 65° C. Then, 68 parts by weight of isophorone diisocyanate was slowly introduced into the reaction container. Subsequently, the temperature was raised to 80° C. and an NCO content of 2.4% was maintained to produce a prepolymer. 520 parts by weight of ion-exchanged water was mixed with 7 parts by weight of triethylamine, and the prepolymer was added to the mixture over 20 minutes while stirring at high speed at a temperature of 25 to 35° C. to form a water dispersion. Then, a mixture of 58 parts by weight of ion-exchanged water and 5 parts by weight of ethyleneamine was introduced into the reaction container, and the substances were subjected to chain extension to produce a polyurethane dispersion resin having an acid value of 20 mgKOH/g and a solid content of 35 wt %.

Production Example 5: Production of (meth)acryl-Modified Polyurethane Resin (5)

260 parts by weight of a polyester polyol having a molecular weight of 2,000, 12 parts by weight of dimethylolpropionic acid, and 70 parts by weight of N-methylpyrrolidone were introduced into a reaction container, and the temperature was raised to 65° C. Then, 68 parts by weight of isophorone diisocyanate was slowly introduced into the reaction container. Subsequently, the temperature was raised to 80° C. and an NCO content of 2.4% was maintained to produce a prepolymer. 520 parts by weight of ion-exchanged water was mixed with 7 parts by weight of triethylamine, and the prepolymer was added to the mixture over 20 minutes while stirring at high speed at a temperature of 25 to 35° C. to form a water dispersion. Then, a mixture of 58 parts by weight of ion-exchanged water and 5 parts by weight of ethyleneamine was introduced into the reaction container, and the substances were subjected to chain extension to produce a self-emulsifying urethane water dispersion having an acid value of 20 mgKOH/g and a solid content of 35 wt %.

710 g of the produced urethane water dispersion was introduced into a flask containing 118 g of ion-exchanged water whose temperature was adjusted to 80° C. 54 g of methyl methacrylate, 54 g of n-butyl acrylate, and 0.3 g of ammonium persulfate were dissolved in 53 g of deionized water while stirring, and the solution was introduced into the flask in a dropwise manner over four hours. Two hours later, the substances were cooled to produce a (meth)acryl-modified polyurethane dispersion resin having an acid value of 14 mgKOH/g, a solid content of 35 wt %, a pH of 7, a number average molecular weight of 80,000, a Tg of 4° C., and an average particle diameter of 150 nm.

Examples and Comparative Examples

Water-based paint compositions for vehicle were prepared using the resin components produced according to the production examples. The ingredients were mixed in the order shown in Table 1 provided below, and the final viscosity was adjusted such that the compositions passed through an orifice of the Ford Flow Cup #4 in 55 seconds. Each of the prepared water-based paint compositions for vehicle was applied, by bell application, as a first basecoat (thickness of dried film of paint: 12~16 μm) and a second basecoat (thickness of dried film of paint: 10~20 μm) on a surface for electrodeposition, and any water remaining in the paint was evaporated by blown hot air at 80° C. for three minutes. A clear topcoat was applied thereon and was cured in a general oven at a temperature of 140 to 150° C. for 20 to 30 minutes to form a final film of paint. The appearance and material properties of the final film of paint were observed, and the result thereof is shown in Table 2 provided below.

TABLE 1

(unit: wt %)

| Ingredients | Examples | | | Comparative examples | | | | | |
|---|---|---|---|---|---|---|---|---|---|
| | 1 | 2 | 3 | 1 | 2 | 3 | 4 | 5 | 6 |
| Distilled water | 20.3 | 20.3 | 20.3 | 20.3 | 20.3 | 20.3 | 20.3 | 20.3 | 20.3 |
| Cosolvent 1 | 3.6 | 3.6 | 3.6 | 3.6 | 3.6 | 3.6 | 3.6 | 3.6 | 3.6 |
| Cosolvent 2 | 1.5 | 1.5 | 1.5 | 1.5 | 1.5 | 1.5 | 1.5 | 1.5 | 1.5 |
| Cosolvent 3 | 4 | 4 | 4 | 4 | 4 | 4 | 4 | 4 | 4 |
| Core-shell microgel resin (1) | 25.6 | 27.1 | 24.1 | 25.6 | — | 25.6 | — | 25.1 | 16.1 |
| Polyester resin (2) | — | — | — | 3.5 | 3.5 | — | 3.5 | — | — |
| Dimer-modified polyester resin (3) | 3.5 | 2 | 5 | — | — | 3.5 | — | 0.5 | 13 |
| Polyurethane resin (4) | — | — | — | 6 | 31.6 | 6 | — | — | — |
| (Meth)acryl-modified polyurethane resin (5) | 6 | 6 | 6 | — | — | — | 31.6 | 6 | 6 |
| Melamine curing agent | 5.3 | 5.3 | 5.3 | 5.3 | 5.3 | 5.3 | 5.3 | 5.3 | 5.3 |
| Catalyst | 1.4 | 1.4 | 1.4 | 1.4 | 1.4 | 1.4 | 1.4 | 1.4 | 1.4 |
| Wetting agent | 1.2 | 1.2 | 1.2 | 1.2 | 1.2 | 1.2 | 1.2 | 1.2 | 1.2 |
| UV absorber | 0.6 | 0.6 | 0.6 | 0.6 | 0.6 | 0.6 | 0.6 | 0.6 | 0.6 |

TABLE 1-continued (unit: wt %)

|  | Examples | | | Comparative examples | | | | | |
| --- | --- | --- | --- | --- | --- | --- | --- | --- | --- |
| Ingredients | 1 | 2 | 3 | 1 | 2 | 3 | 4 | 5 | 6 |
| Pigment | 23 | 23 | 23 | 23 | 23 | 23 | 23 | 23 | 23 |
| Thickener | 2.1 | 2.1 | 2.1 | 2.1 | 2.1 | 2.1 | 2.1 | 2.1 | 2.1 |
| Neutralizing agent | 1.9 | 1.9 | 1.9 | 1.9 | 1.9 | 1.9 | 1.9 | 1.9 | 1.9 |
| Total | 100 | 100 | 100 | 100 | 100 | 100 | 100 | 100 | 100 |

[Used Ingredients Other than Resin Components]
Cosolvent 1: Ethylene glycol monobutyl ether
Cosolvent 2: n-propyl alcohol
Cosolvent 3: N-methylpyrrolidone
Melamine curing agent: Melamine resin having an imino group
Catalyst: Dodecylbenzenesulfonic acid-type acid catalyst
Wetting agent: Acetylene-alcohol-type wetting agent
Ultraviolet (UV) absorber: Benzotriazole-based UV absorber
Pigment: Aluminum paste (a metal pigment EMR D5620 available from Toyo Aluminum K.K.)
Thickener: Alkali-soluble thickener (AM-3 available from San Nopco Korea Ltd.)
Neutralizing agent: Amine-based neutralizing agent (10% aqueous solution of aminomethyl propanol (AMP-95™ available from ANGUS Chemical Company))

[Evaluation Method and Evaluation Criteria]
Paint workability: The paint should be released under good spraying conditions and exhibit good wettability with respect to the substrate.
Film of paint appearance: Wave-scan DOI (available from BYK-Gardner GmbH), which characterizes the appearance of the automobile, is used to determine the final CF value (a higher CF value is more desirable). The results are expressed as ⊚—Excellent (CF 65 or more), ○—Good (CF 60 or more and below 65), Δ—Fair (CF 55 or more and below 60), and X—Poor (below CF 55).
Gloss: The film of paint should have a 20-degree gloss of 90 or more.
Adhesion between newly applied film of paint and overbaked film: The final film of paint is cured at 150° C. for 20 minutes and then is overbaked at 150° C. for 60 minutes. Subsequently, an upper film of paint and a transparent upper film of paint are newly applied, cured, and then subjected to an adhesion test (100 crosscuts, each measuring 2 mm, are made, and a pressure-sensitive adhesive tape is applied over the cuts and then is removed by being pulled off. A film of paint that remains intact is classified as "Good." A film of paint that remains intact even in the area crosscut by the blade is classified as "Excellent." The rest is classified as "Poor.")
Impact resistance: The film of paint should not form a crack nor does it peel when a weight of 500 g is dropped from a height of 30 cm or more onto the film of paint.
Water resistance: The finished film of paint is evaluated for adhesion and discoloration after being immersed in a 40° C. thermostatic bath for ten days.

TABLE 2

| Evaluation criteria | Example 1 | Example 2 | Example 3 | Comparative Example 1 | Comparative Example 2 | Comparative Example 3 | Comparative Example 4 | Comparative Example 5 | Comparative Example 6 |
| --- | --- | --- | --- | --- | --- | --- | --- | --- | --- |
| Paint workability | ⊚ | ⊚ | ⊚ | ○ | Δ | ○ | ○ | ○ | ○ |
| Film of paint appearance | ⊚ | ⊚ | ⊚ | ○ | X | ○ | Δ | X | ○ |
| Gloss | ⊚ | ⊚ | ⊚ | ○ | ⊚ | ○ | ○ | ⊚ | ⊚ |
| Adhesion between newly applied film of paint and overbaked film | ⊚ | ⊚ | ⊚ | ○ | ○ | X | X | X | ⊚ |
| Impact resistance | ⊚ | ⊚ | ⊚ | ○ | ⊚ | Δ | ⊚ | ⊚ | ⊚ |
| Water resistance | ⊚ | ⊚ | ○ | Δ | Δ | X | Δ | ⊚ | X |
| Paint flowability | ⊚ | ⊚ | ⊚ | Δ | ⊚ | ○ | Δ | ⊚ | ⊚ |
| Chip resistance | ⊚ | ○ | ⊚ | Δ | Δ | ○ | Δ | Δ | ⊚ |

Evaluation:
⊚ - Excellent,
○ - Good,
Δ - Fair,
X - Poor

Paint flowability: When a specimen including a middle coat applied by electrodeposition is hung vertically and then an upper coat is applied and cured under varying conditions, no flowing, gloss degradation, etc. of the paint are observed.
Chip resistance: The film of paint is kept at −20° C. for three hours, and then a surface thereof is hit by a 50 g chipping stone at a pressure of 4 bars (A film of paint having ten or less damaged areas sized 1 mm or less is classified as "Excellent." A film of paint having ten or less damaged areas sized over 1 mm and no greater than 2 mm is classified as "Good." A film of paint having ten or less damaged areas sized over 2 mm and no greater than 3 mm is classified as "Fair.")
Based on the results shown in Table 2, it can be seen that the water-based paints according to the examples of the present invention result in good film of paint appearance, high workability, etc. compared to those offered by conventional coating techniques and exhibit excellent mechanical properties such as an adhesion property, water resistance, and chip resistance while being capable of shortening the coating process.

On the other hand, problems in material properties such as adhesion, chip resistance, etc. were observed in Comparative Example 1. Also, degradation of mechanical properties (e.g., chip resistance and gloss) and paint flowability, and poor appearance caused by basecoat intermingling were observed in Comparative Example 2. In the case of Comparative Example 3, low water resistance, and poor adhesion due to the low reactivity between the newly applied clearcoat and the overbaked basecoat were observed. Comparative Examples 4 and 5 also exhibited poor adhesion due to the low reactivity between the newly applied clearcoat and the overbaked basecoat. In the case of Comparative Example 6, low water resistance was observed.

The invention claimed is:

1. A water-based paint composition for a vehicle, the water-based paint composition comprising:
   a core-shell microgel resin, a dimer-modified polyester resin, a (meth)acryl-modified polyurethane resin, a curing agent, a pigment, and water,
   wherein the dimer-modified polyester resin is comprised in an amount of 1 to 10 wt % with respect to 100 wt % of the water-based paint composition.

2. The water-based paint composition for the vehicle according to claim 1, wherein the core-shell microgel resin has a solid content of 30 to 70% with respect to a total weight of the core-shell microgel resin, an acid value of 5 to 60 mgKOH/g, a glass transition temperature of −15 to 20° C., and a particle diameter of 50 to 200 nm.

3. The water-based paint composition for the vehicle according to claim 1, wherein the dimer-modified polyester resin is a polyester resin produced by condensation polymerization of a dicarboxylic acid component comprising a dimer acid, with a polyhydric alcohol component comprising a diol obtained by reducing a dimer acid.

4. The water-based paint composition for the vehicle according to claim 1, wherein the dimer-modified polyester resin has a solid content of 60 to 90% with respect to a total weight of the dimer-modified polyester resin, an acid value of 5 to 40 mgKOH/g, a number average molecular weight of 1,000 to 4,000, and a glass transition temperature of −40 to −20° C.

5. The water-based paint composition for the vehicle according to claim 1, wherein the (meth)acryl-modified polyurethane resin is a modified polyurethane resin produced by reacting a urethane prepolymer, which is a reaction product of a polyol and an isocyanate, with one or more (meth)acrylates.

6. The water-based paint composition for the vehicle according to claim 1, wherein the (meth)acryl-modified polyurethane resin has a solid content of 30 to 60% with respect to a total weight of the (meth)acryl-modified polyurethane resin, a number average molecular weight of 8,000 to 100,000, an acid value of 15 to 35 mgKOH/g, and a particle diameter of 50 to 200 nm.

* * * * *